(12) United States Patent
 Anderson et al.

(10) Patent No.: US 11,014,314 B2
(45) Date of Patent: May 25, 2021

(54) END EFFECTOR FOR FORMING PREPREG PLIES ON HIGHLY CONTOURED SURFACES

(71) Applicant: The Boeing Company, Chicago, IL (US)

(72) Inventors: Michael Robert Anderson, Renton, WA (US); Jeffrey H. Olberg, Federal Way, WA (US); Ryan Christopher Lucas, Roy, WA (US)

(73) Assignee: The Boeing Company, Chicago, IL (US)

( * ) Notice: Subject to any disclaimer, the term of this patent is extended or adjusted under 35 U.S.C. 154(b) by 218 days.

(21) Appl. No.: 16/022,013

(22) Filed: Jun. 28, 2018

(65) Prior Publication Data

US 2020/0001551 A1 Jan. 2, 2020

(51) Int. Cl.
| | | |
|---|---|---|
| *B29C 70/38* | (2006.01) | |
| *B29C 70/54* | (2006.01) | |
| *B25J 11/00* | (2006.01) | |
| *B25J 13/08* | (2006.01) | |
| *B25J 15/00* | (2006.01) | |
| *B29L 31/30* | (2006.01) | |

(52) U.S. Cl.
CPC ............ *B29C 70/38* (2013.01); *B25J 11/005* (2013.01); *B25J 13/088* (2013.01); *B25J 15/0019* (2013.01); *B29C 70/541* (2013.01); *B29L 2031/3082* (2013.01)

(58) Field of Classification Search
CPC ..... B25J 11/005; B25J 13/088; B25J 15/0019
See application file for complete search history.

(56) References Cited

U.S. PATENT DOCUMENTS

| | | | |
|---|---|---|---|
| 4,512,837 A | 4/1985 | Sarh et al. | |
| 5,352,306 A | 10/1994 | Grimshaw et al. | |
| 7,670,525 B2 | 3/2010 | Weidmann et al. | |
| 7,943,076 B1 | 5/2011 | Hawkins et al. | |
| 8,151,529 B2 | 4/2012 | Weidmann et al. | |
| 8,349,105 B2 | 1/2013 | Kehrl et al. | |
| 8,551,380 B2 | 10/2013 | Hawkins et al. | |
| 8,632,653 B2 | 1/2014 | Brown et al. | |
| 9,314,974 B2 | 4/2016 | Buttrick et al. | |
| 2003/0205334 A1 | 11/2003 | Sherrill et al. | |

(Continued)

FOREIGN PATENT DOCUMENTS

| | | |
|---|---|---|
| DE | 102010039955 A1 | 3/2012 |
| WO | WO2006119002 A2 | 11/2006 |
| WO | WO2009129007 A2 | 10/2009 |

OTHER PUBLICATIONS

Heney, "What are pneumatic cylinders?" published Sep. 26, 2012, https://www.pneumatictips.com/what-are-pneumatic-cylinders/, accessed Dec. 7, 2020. (Year: 2012).*

(Continued)

*Primary Examiner* — Kelly M Gambetta
(74) *Attorney, Agent, or Firm* — Yee & Associates, P.C.

(57) ABSTRACT

Apparatus including a robotically controlled end effector having a compliant nosepiece that forms plies of a material onto contoured surfaces of a tool. The end effector includes a plurality of individually controllable rotary actuators which respectively control the position and compliancy of individual sections of the nosepiece in order to better conform the plies the contoured tool surfaces.

19 Claims, 16 Drawing Sheets

(56) References Cited

U.S. PATENT DOCUMENTS

| | | | |
|---|---|---|---|
| 2005/0209735 A1* | 9/2005 | Groppe | B29C 70/545 |
| | | | 700/245 |
| 2006/0090856 A1 | 5/2006 | Nelson et al. | |
| 2006/0249868 A1 | 11/2006 | Brown et al. | |
| 2007/0229805 A1 | 10/2007 | Engelbart et al. | |
| 2009/0130450 A1* | 5/2009 | Anderson | B29C 70/38 |
| | | | 428/411.1 |
| 2009/0261199 A1 | 10/2009 | McCarville et al. | |
| 2009/0263618 A1 | 10/2009 | McCarville et al. | |
| 2010/0024971 A1 | 2/2010 | Benson et al. | |
| 2010/0102482 A1 | 4/2010 | Jones et al. | |
| 2011/0097554 A1 | 4/2011 | Kerhl et al. | |
| 2011/0303350 A1 | 12/2011 | Brown et al. | |
| 2012/0006475 A1 | 1/2012 | Colombo et al. | |
| 2012/0076973 A1 | 3/2012 | Guzman | |
| 2012/0121866 A1 | 5/2012 | Hawkins et al. | |
| 2013/0084434 A1 | 4/2013 | Kehrl et al. | |
| 2013/0153154 A1 | 6/2013 | Boge et al. | |
| 2014/0065354 A1 | 3/2014 | Smith, Jr. et al. | |
| 2014/0190625 A1 | 7/2014 | Buttrick et al. | |
| 2014/0338829 A1 | 11/2014 | Peng et al. | |
| 2015/0041048 A1* | 2/2015 | Anderson | B29D 99/0003 |
| | | | 156/196 |
| 2015/0328876 A1* | 11/2015 | Nishimura | B32B 41/00 |
| | | | 156/64 |
| 2016/0214330 A1 | 7/2016 | Buttrick et al. | |
| 2020/0039154 A1 | 2/2020 | Buttrick et al. | |

OTHER PUBLICATIONS

Final Office Action, dated Jun. 5, 2018, regarding U.S. Appl. No. 14/525,500, 23 pages.

International Search Report and Written Opinion, dated Feb. 21, 2014, regarding Application No. PCT/US2013/071124, 11 pages.

International Preliminary Report on Patentability, dated Jul. 7, 2015, regarding Application No. PCT/US2013/071124, 7 pages.

State Intellectual Property Office of China Report of Second Office Action and English translation, Chinese Patent Application No. 2013800696562, dated Dec. 16, 2016, 12 pages.

State Intellectual Property Office of China Report of Third Office Action and English translation, dated Jun. 26, 2017, Chinese Patent Application No. 201380069656.2, 16 pages.

State Intellectual Property Office of China Notification of the Decision of Rejection and English translation, dated Jan. 30, 2018, regarding Application No. 201380069656.2, 17 pages.

Japanese Notice of Reasons for Rejection and English translation, dated Oct. 2, 2017, regarding Application No. 2015-551676, 9 pages.

Japanese Notice of Reasons for Rejection and English translation, dated Jan. 30, 2018, regarding Application No. 2015-551676, 7 pages.

Office Action, dated Aug. 27, 2015, regarding U.S. Appl. No. 13/901,813, 27 pages.

Notice of Allowance, dated Dec. 15, 2015, regarding U.S. Appl. No. 13/901,813, 13 pages.

Office Action, dated Jul. 28, 2017 regarding U.S. Appl. No. 14/525,500, 28 pages.

Office Action, dated Jul. 11, 2019, regarding U.S. Appl. No. 14/525,500, 14 pages.

Office Action, dated Mar. 7, 2019, regarding U.S. Appl. No. 15/089,399, 36 pages.

Notice of Allowance dated Sep. 3, 2020, regarding U.S. Appl. No. 14/525,500, 47 pages.

* cited by examiner

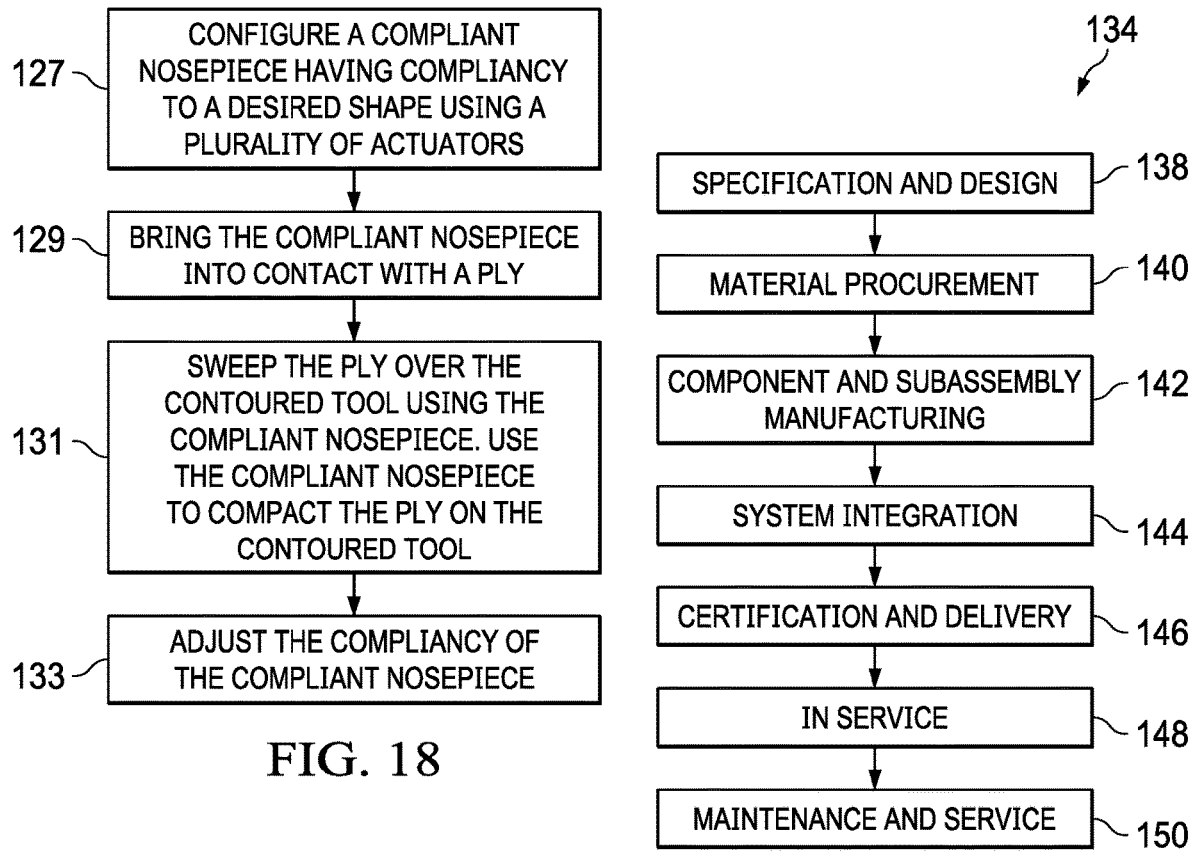
FIG. 18
FIG. 19
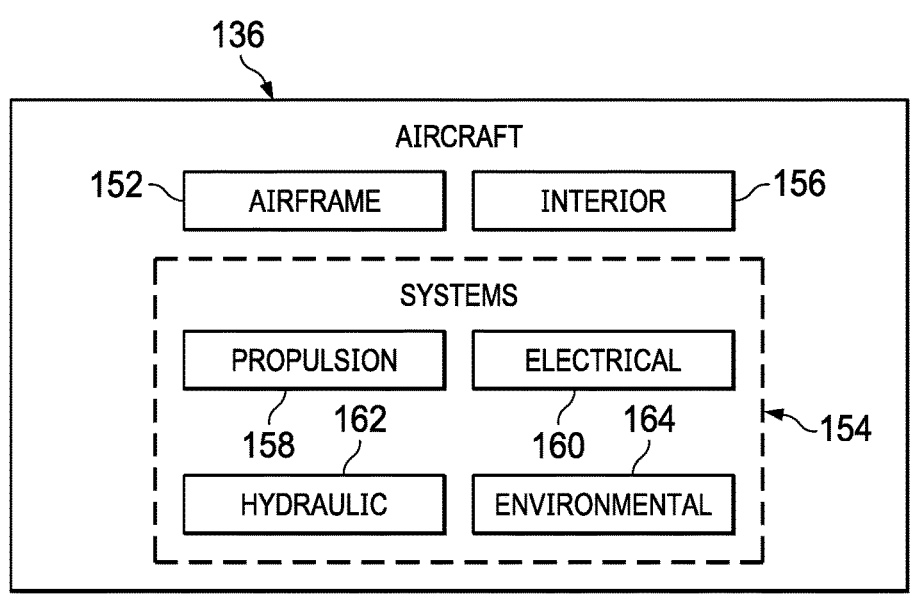
FIG. 20

END EFFECTOR FOR FORMING PREPREG PLIES ON HIGHLY CONTOURED SURFACES

BACKGROUND INFORMATION

1. Field

The present disclosure generally relates to manufacturing composite laminate parts, and deals more particularly with an end effector for forming prepreg plies on highly contoured surfaces.

2. Background

Composite laminate structures having highly contoured surfaces can present challenges during fabrication, particularly in high production rate environments. To prevent puckering or wrinkling during layup of a highly contoured structure, composite plies may need to be individually laid up and swept down over tool surfaces. Conventional forming processes are often limited in their ability to form large prepreg plies to tight radii of curvatures and non-flat tool surfaces and webs having variable widths. Equipment has been developed to partially automate the layup process but has limited forming ability in areas of sharp curvature where significant ply shearing is required.

Accordingly, it would be desirable to provide a cost-effective, highly efficient end effector for forming/compacting prepreg plies on highly contoured and/or complex tool surfaces.

SUMMARY

The disclosure relates in general to processes and equipment for manufacturing highly contoured composite laminate parts, and more specifically to an end effector capable of forming large prepreg plies over highly contoured and/or complex tool surfaces where significant ply shearing is required in order to avoid ply puckering or wrinkling. The end effector allows plies to conform to tighter radii of curvatures, contoured/angled web surfaces and webs having a variable width. The end effector may be attached to a manipulator such as an articulated arm robot that allows it to be moved to any location or orientation in order to hold and form a prepreg ply onto a highly contoured tool surface.

The end effector employs a plurality of double acting rotary actuators that are both extendable and retractable to closely control the position of a compliant nosepiece used to form the ply onto the tool. The end effector also includes rack and pinion drives coupling the actuators with the nosepiece. The use of multiple, individually controllable rotary actuators permits controlling forming forces at different levels and in individual zones along the nosepiece, as may be required. Multi-directional forces applied to the nosepiece by the actuators better conform the ply against the tool surfaces. The rotary actuators include encoded readers which sense position, enabling storage of nosepiece position, which in turn permits faster programming and process quality/repeatability. The use of individual actuators also allows the exact position of the tool surface to be recorded at any given position along a path. One or more of the actuators may be locked in a fixed position if desired in order to better control locally applied forming forces. Optionally, the end effector may include a ply carrier for transporting and holding a ply during the forming process.

According to one aspect, an end effector is provided for forming a composite ply onto a contoured tool surface. The end effector includes a plurality of actuators coupled with nosepiece drives that displace an elongate, compliant nosepiece configured to form the composite ply down against the contoured tool surface. Each of the nosepiece drives is coupled with a corresponding section of the nosepiece. Each of the actuators is configured to displace one of the sections of the nosepiece and includes compliancy for limiting the force applied by the actuators to the compliant nosepiece.

According to another aspect, a method is provided of forming a ply on a contoured tool. The method includes configuring a compliant nosepiece having a compliancy to a desired shape using a plurality of actuators, and bringing the compliant nosepiece into contact with the ply. The method further includes sweeping the ply over the contoured tool using the compliant nosepiece including using the compliant nosepiece to compact the ply on the contoured tool. The method also includes adjusting the compliancy of the compliant nosepiece. A.

According to still further aspect, apparatus is provided for forming a composite ply onto a contoured tool surface. The apparatus includes an end effector configured to be mounted on an automatically controlled manipulator. The end effector includes an elongated, compliant nosepiece is provided for forming the composite ply on the tool surface. A plurality of pneumatically operated rotary actuators are configured to be coupled with a source of pneumatic pressure. A plurality of position sensors are provided which are configured to respectively sense the positions of the rotary actuators. A plurality of nosepiece drives are respectively coupled between the rotary actuators and the nosepiece. The nosepiece drives are configured to extend and retract corresponding local sections of the nosepiece. The apparatus further includes a controller coupled with the rotary actuators and the position sensors for controlling operation of the rotary actuators.

One of the advantages of the end effectors is that plies can be better conformed to highly contoured and/or complex tool surfaces without puckering or wrinkling. Another advantage is that plies can be formed on angled tool surfaces and with a variable width. Another advantage is that forming forces can be locally varied both in magnitude and location over a tool surface. A further advantage is that the end effector can be readily scaled in size to suit the application. A still further advantage is that the position of the actuators and thus of the nosepiece relative to a tool surface can be recorded and stored for use in automatically tuning and/or programming operation of the end effector.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 18 is an illustration of a flow diagram of a method of forming a ply on a contoured tool.

FIG. 19 is an illustration of a flow diagram of aircraft production and service methodology.

FIG. 20 is an illustration of a block diagram of an aircraft.

DETAILED DESCRIPTION

Figure 1:
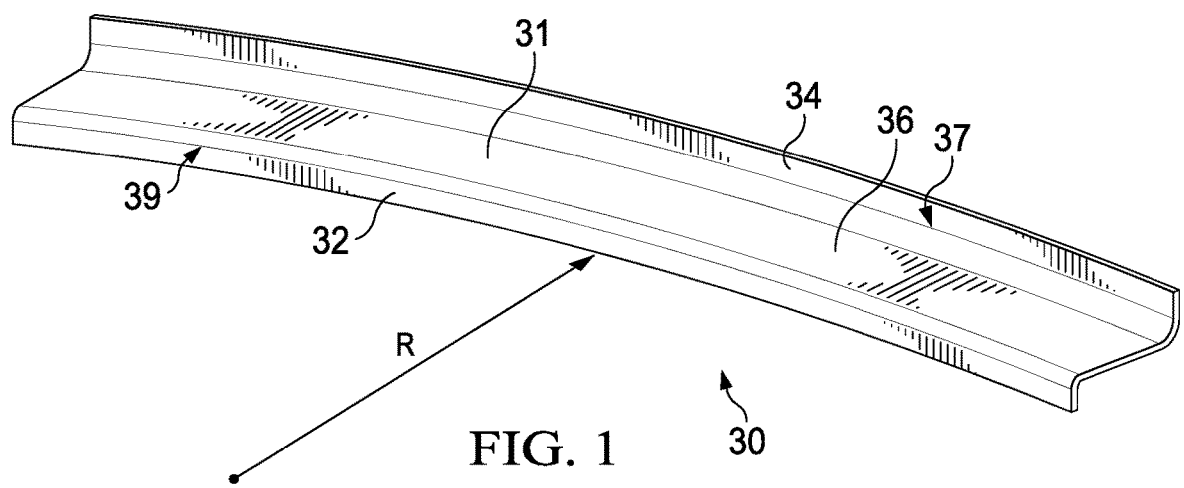
FIG. 1 is an illustration of a perspective view of a highly contoured composite laminate frame section.
Figure 2:
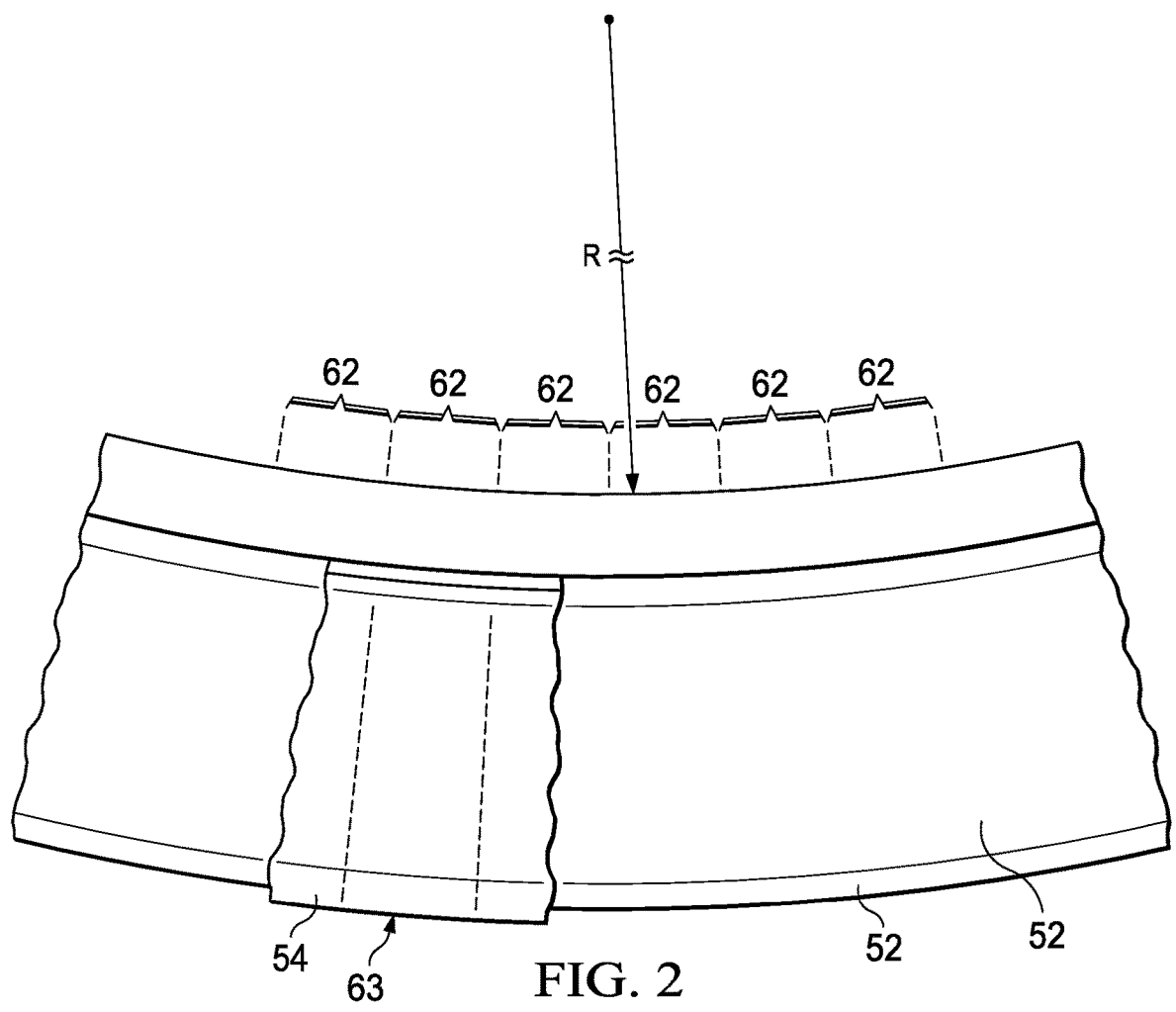
FIG. 2 is an illustration of a top plan view of the frame section shown in FIG. 1, showing multiple sections that are individually and successively formed by an end effector.
Figure 3:
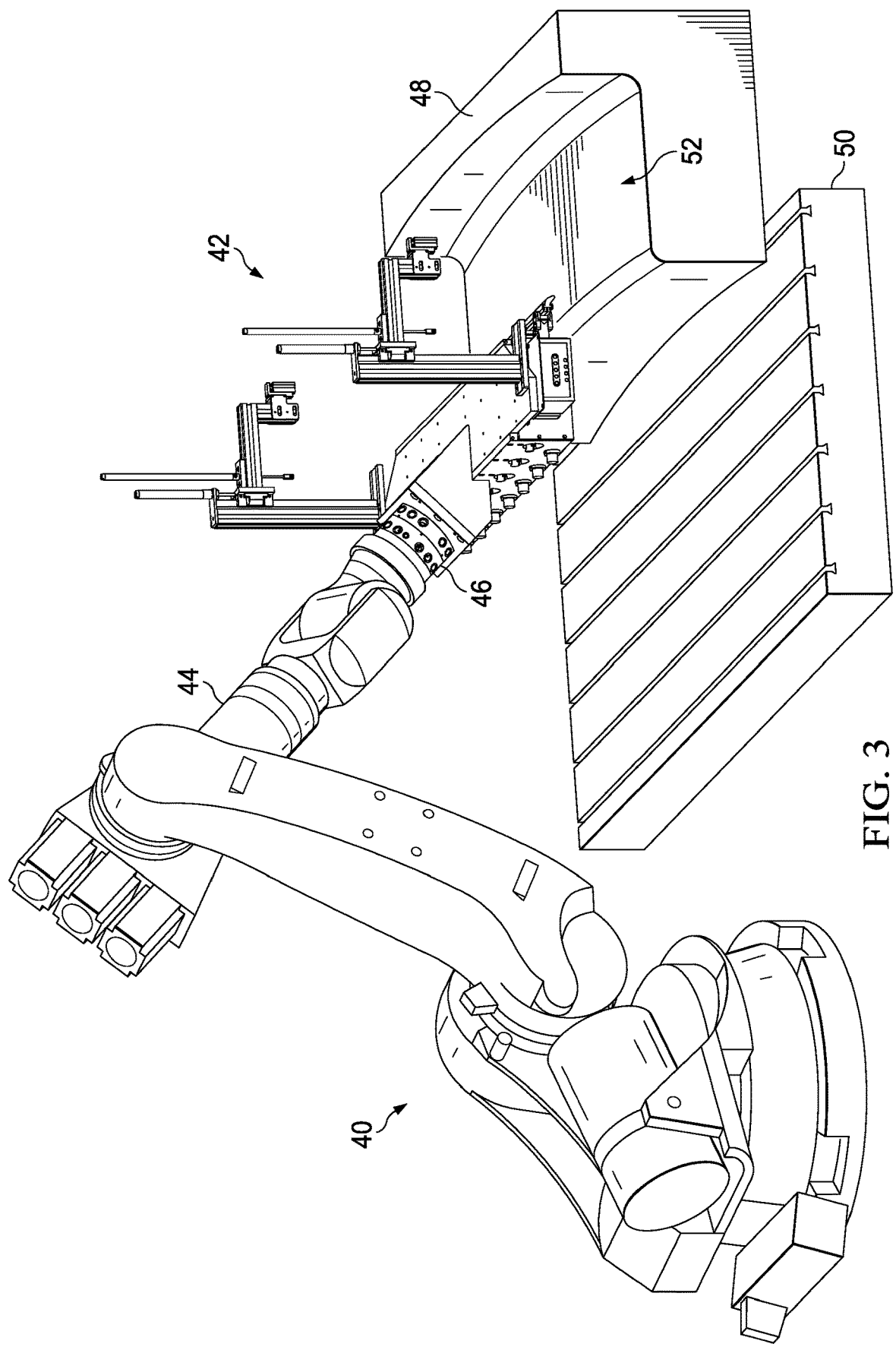
FIG. 3 is an illustration of a perspective view of the end effector mounted on an articulated arm robot, shown in the process of forming and compacting a prepreg ply on a tool.

Referring first to FIGS. 1, 2 and 3, the disclosed embodiments relate to an end effector 42 that may be used to automatically lay up a laminated part 30, such as for example and without limitation, the highly contoured frame section 31 of an aircraft fuselage (not shown) illustrated in FIGS. 1 and 2. The end effector 42 automatically forms and compacts composite plies 54 onto the highly contoured surfaces 52 of a tool 48 used to layup the part 30. The tool 48 is mounted on a tool base 50 and includes surface features matching those of the frame section 31. In the illustrated example, the composite ply 54 is thermoset prepreg, however the end effector 42 may be employed to form plies of other types of material such as, without limitation, fiber reinforced thermoplastic or dry fiber reinforcement fibers or cloth.

As best seen in FIG. 1, the frame section 31 is curved or contoured along its length, with a radius "R". The frame section 31 is generally Z-shaped in cross section, and comprises an inner chord flange 32 and an outer chord flange 34 (sometimes also referred to as a shear tie). The inner and outer chord flanges 32, 34 respectively are connected by a central web 36. The shear tie 34 is connected to the web 36 by a tight shear tie radius 37, and the inner chord flange 32 is connected to the web 36 by a tight inner chord radius 39. It may thus be appreciated that frame section 31 possesses multiple curvatures in different planes and tight radii.

Figure 4:
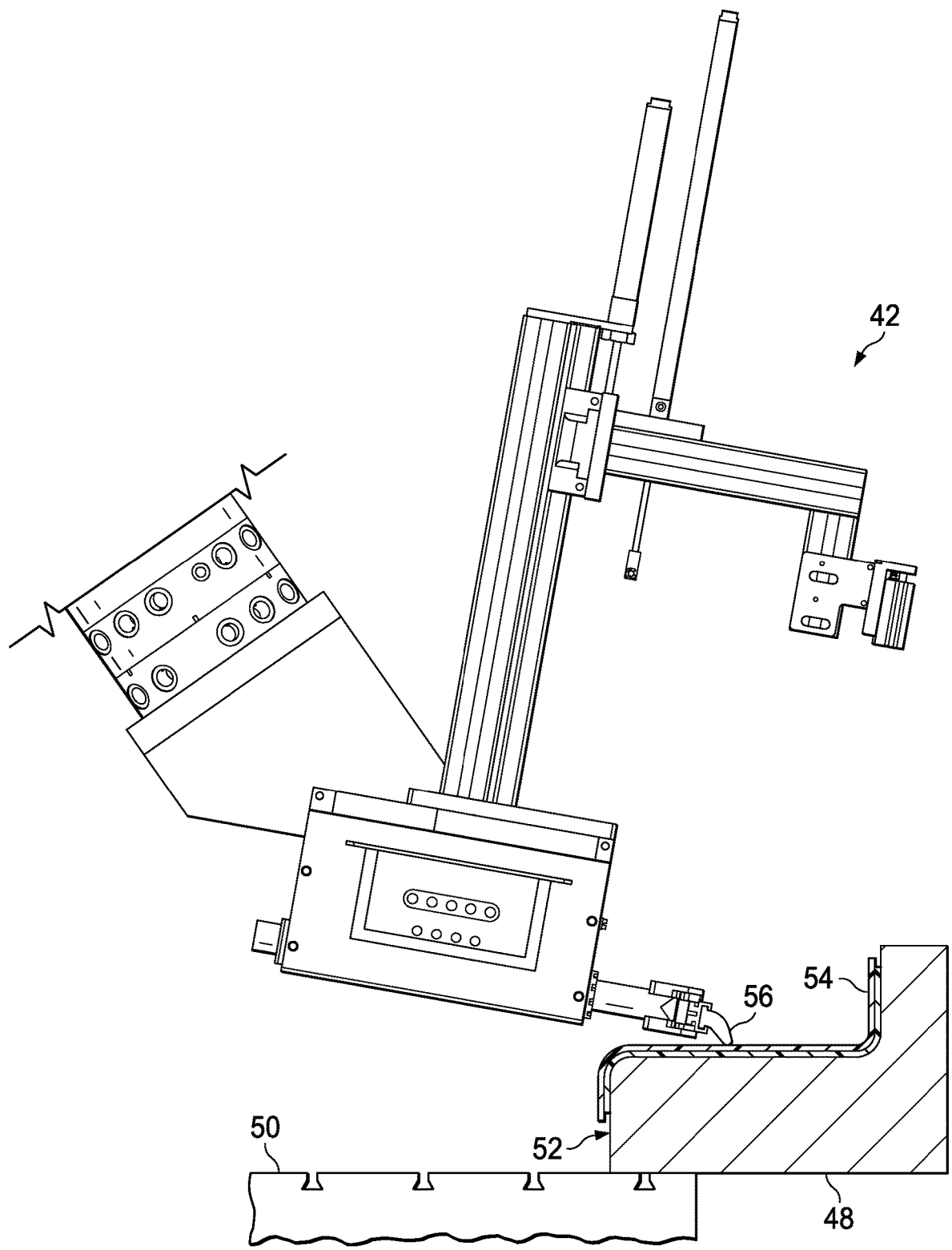
FIG. 4 is an illustration of a side elevational view of the end effector and tool shown in FIG. 3, better illustrating forming of the ply onto the tool surface.

Referring particularly to FIGS. 3 and 4, the end effector 42 is mounted by a quick connect 46 or other mounting method on the arm 44 of an automatically controlled, articulated robot 40, or other suitable automatically controlled manipulator. The robot 40 moves the end effector 42 successively to separate zones 62 of the tool 48, forming a section 63 (FIG. 2) of the ply 54 down over the tool 48 at each of these zone 62, until the ply 54 has been formed at all of the zones 62. The robot 40 sweeps the end effector 42 over the tool 48, forcing a compliant nosepiece assembly 56 to form and compact the ply 54 down over the tool surfaces 52. As shown in FIG. 2, the robot 40 sweeps the end effector 42 over the tool 48 at each of a plurality of zones 62 along the curvature of the tool 48, thereby successively forming the ply 54 within each of the zones 62.

Figure 5:
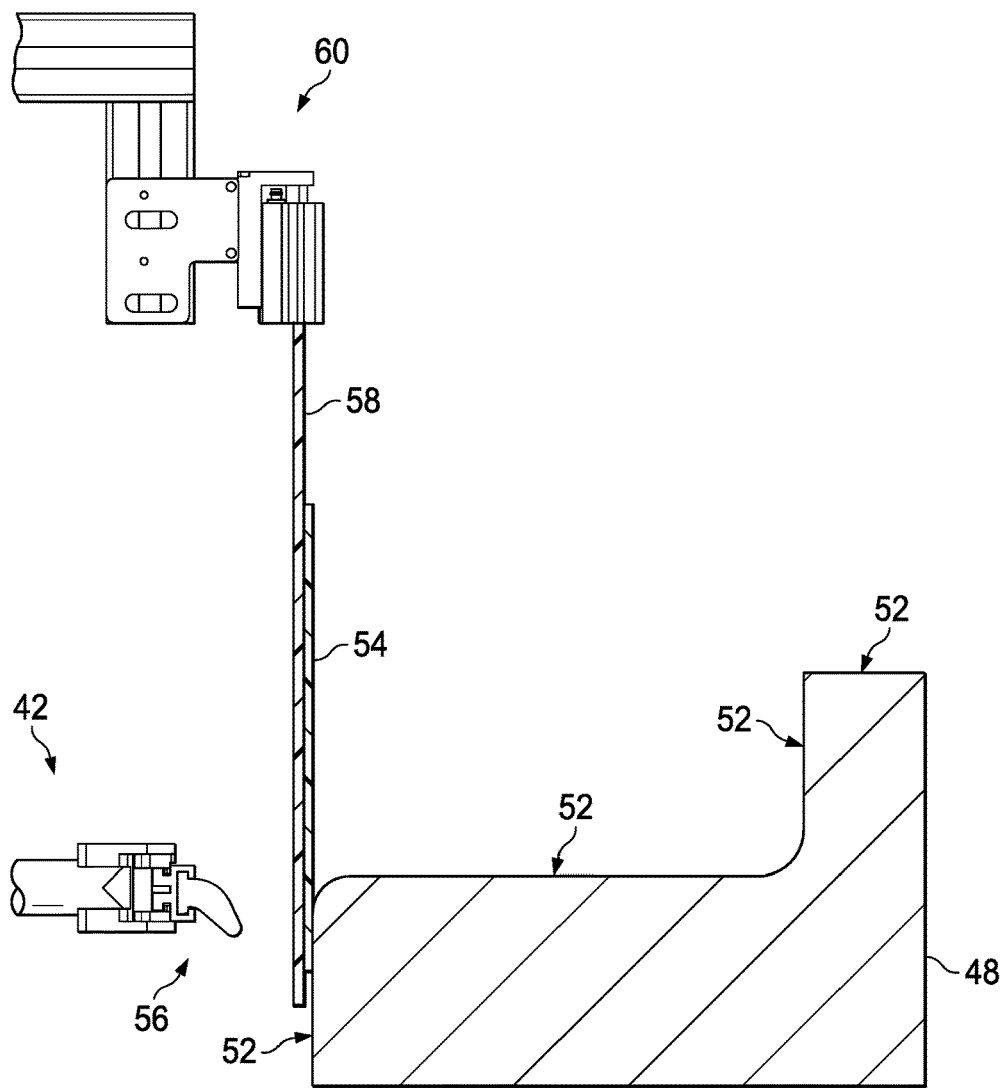
FIG. 5 is an illustration of a side elevational view, in which a prepreg ply supported on a ply carrier has been placed against a surface of the tool, and the nosepiece of the end effector has been positioned in readiness to form the ply.
Figure 6:
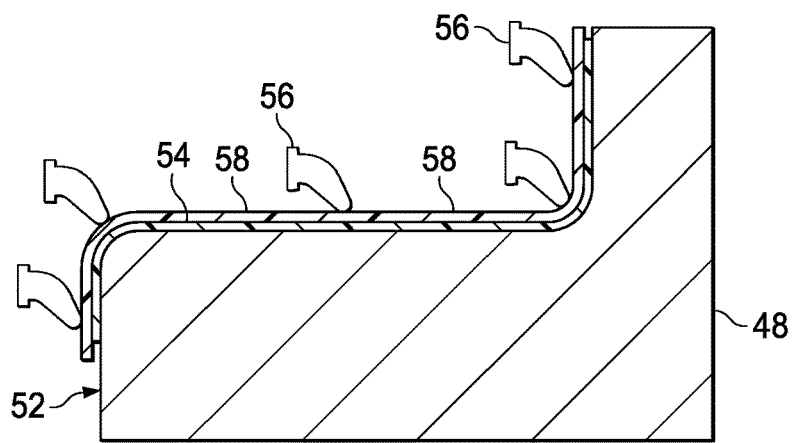
FIG. 6 is an illustration of a side elevational view of the tool shown in FIG. 5, wherein successive positions of the nosepiece are shown during a forming operation.
Figure 7:
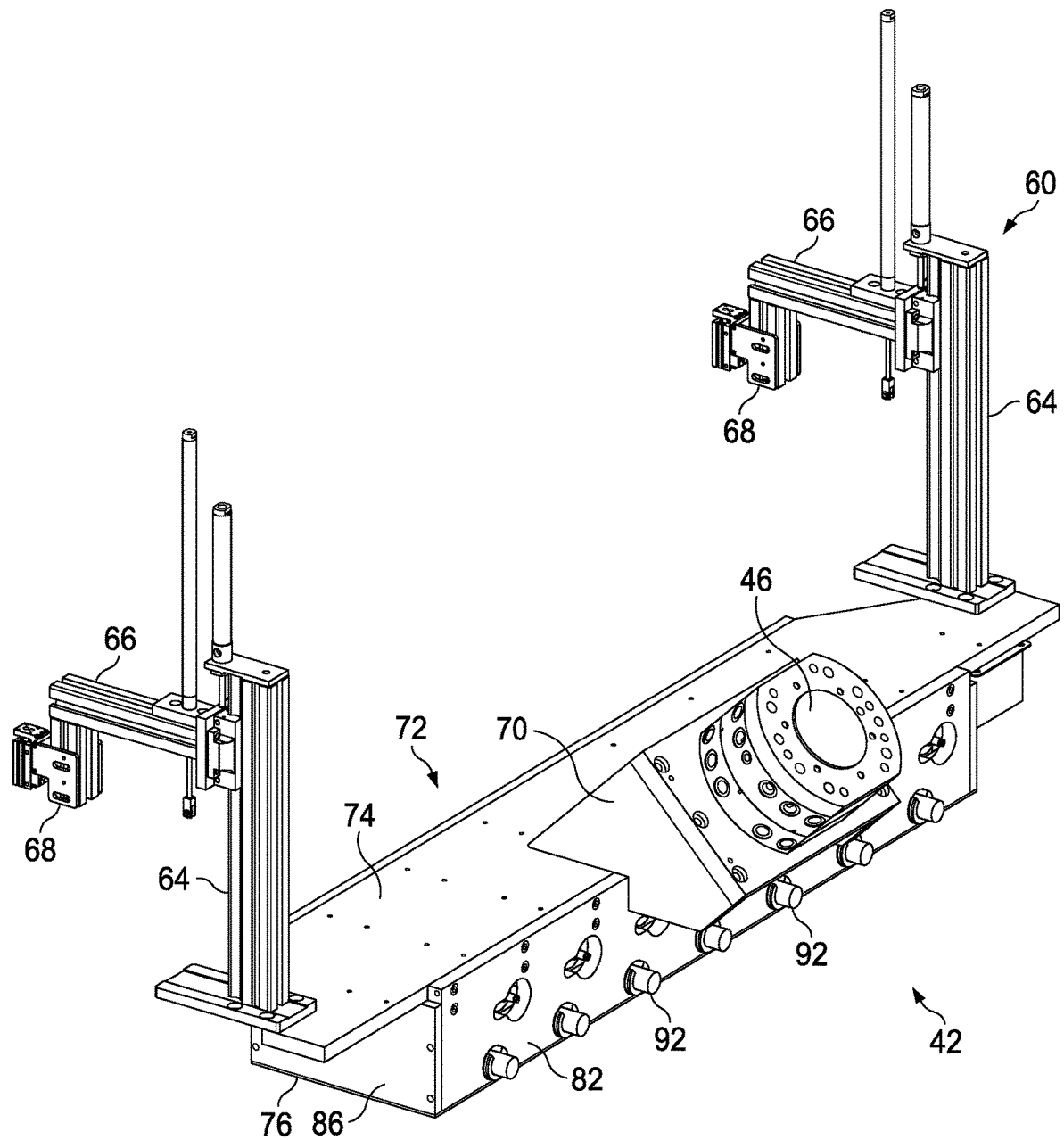
FIG. 7 is an illustration of a rear perspective view of the end effector.
Figure 8:
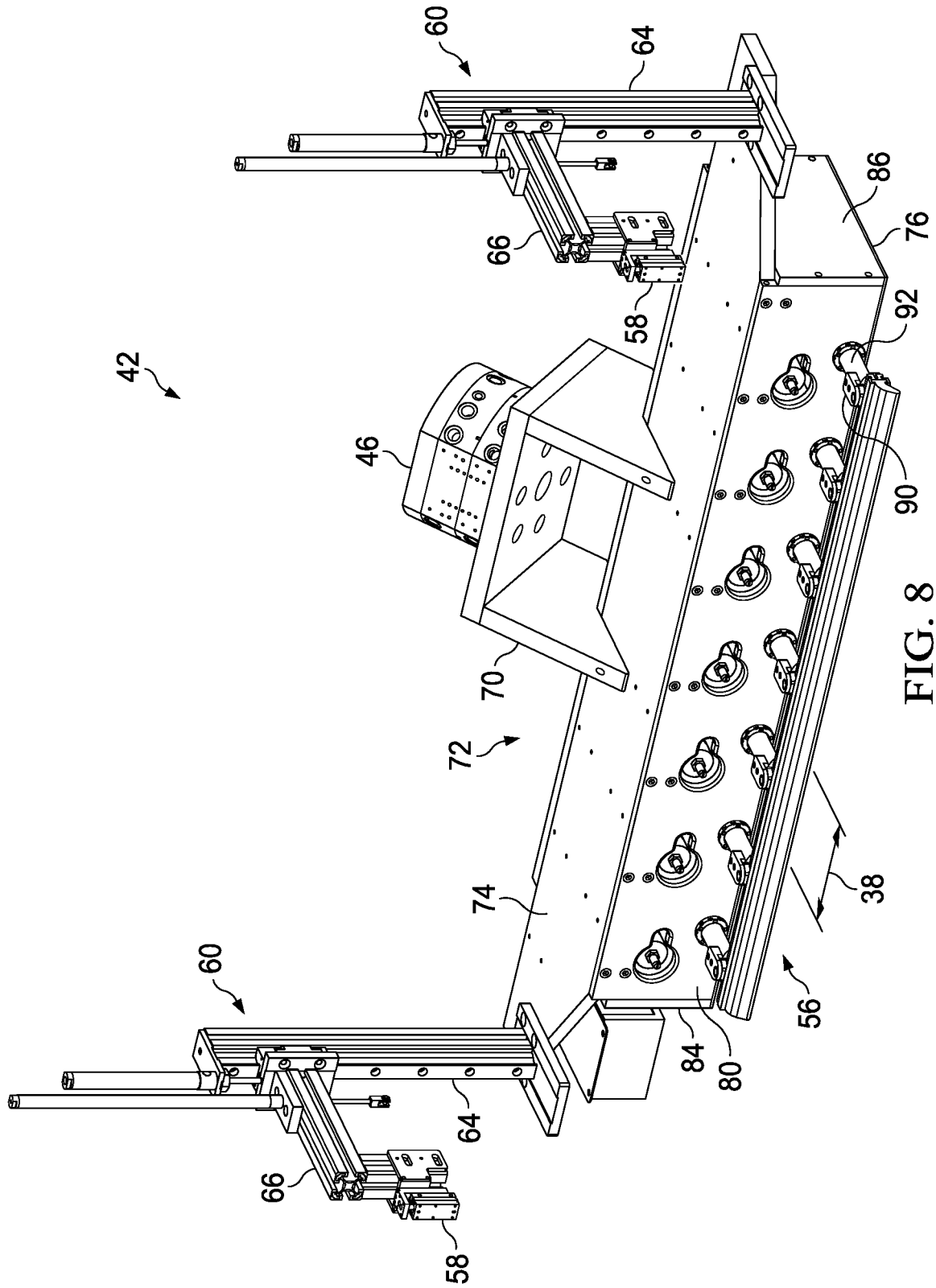
FIG. 8 is an illustration of a front perspective view of the end effector.
Figure 9:
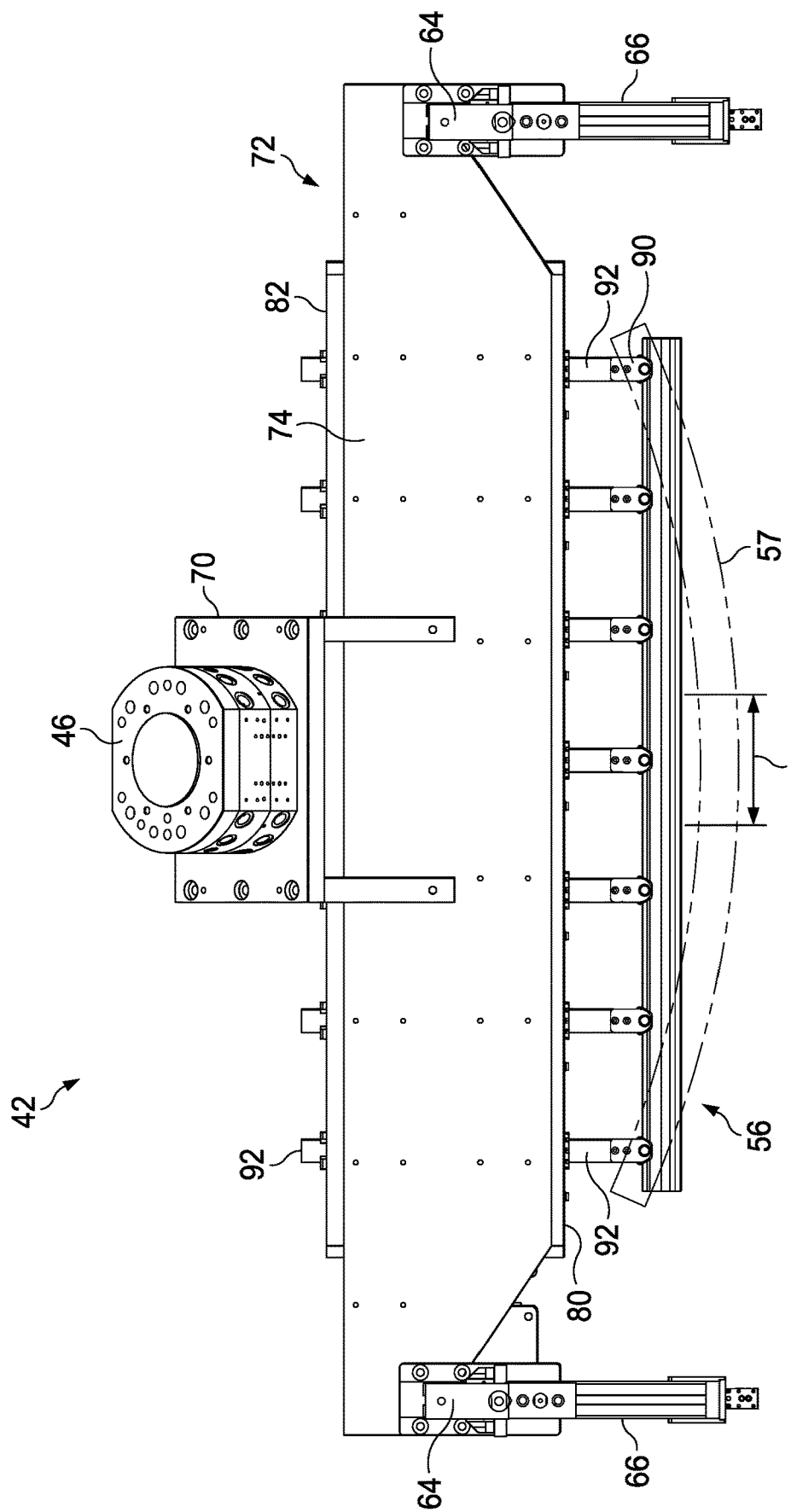
FIG. 9 is an illustration of a top plan view of the end effector, wherein broken lines indicate the shape of the nosepiece assembly altered to match a tool for forming the part shown in FIGS. 1 and 2.
Figure 10:
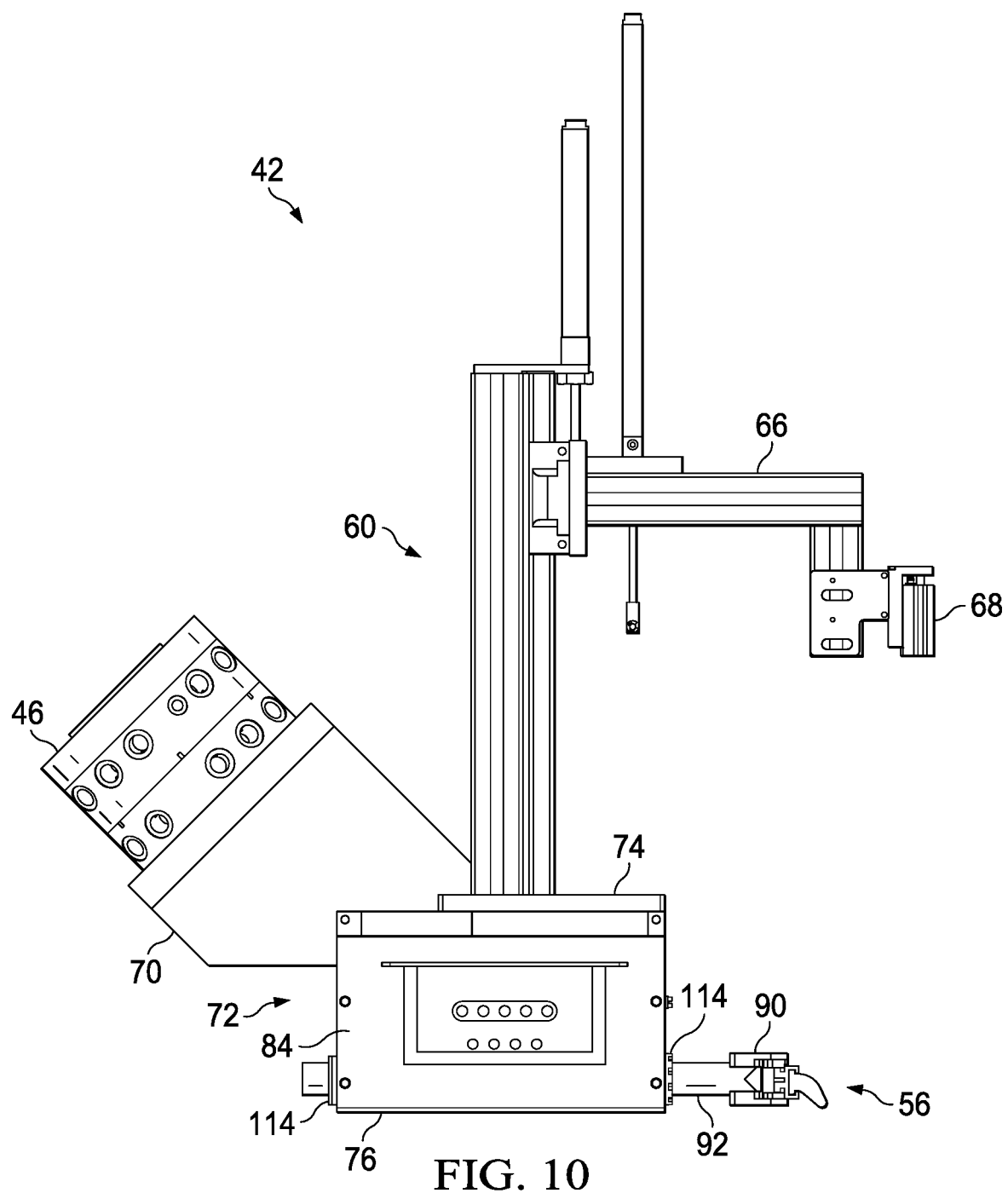
FIG. 10 is an illustration of a left side elevational view of the end effector.

The ply forming process carried out within each of the zones 62 described above is illustrated in FIGS. 5 and 6. As indicated above, the ply forming process may be carried out in a sequential manner in which the end effector 42 is moved by the robot 40 from zone 62 to zone 62, and a corresponding section 63 (FIG. 2) of the ply 54 is formed within each zone 62. For example, and without limitation, when the ply 54 has been fully formed within one of the zones 62, the robot 40 moves the end effector to another zone 62, typically to an adjacent zone 62, where the ply forming process is repeated by the end effector 42. The process of forming sections 63 of the ply 54 in a zone 62, and moving the end effector to an adjacent zone is repeated until all sections 63 of the ply 54 have been formed. A flat ply 54 is adhered to a ply carrier 58 which may be supported by a ply carrier support assembly 60. The ply 54 is initially positioned such that a portion thereof is placed in contact with a tool surface 52. The end effector 42 brings the compliant nosepiece assembly 56, including a compliant nosepiece 56a, into contact with the ply carrier 58 and then sweeps the ply 54 over the tool 48, causing the ply 54 to be formed down onto and conform to the tool surfaces 52. As will be discussed below, the compliant nosepiece 56a has a compliancy that can be adjusted as the ply 54 is being swept over and down onto the tool surfaces 52. Following this forming operation, the end effector 42 withdraws the nosepiece assembly 56, and the ply carrier 58 is separated and drawn away from the fully formed ply 54.

Attention is now directed to FIGS. 7-10 which illustrate one embodiment of the end effector 42. The end effector 42 has a frame 72 that is connected to the quick connect 46 or other connector by an attachment bracket 70. The frame 72 is a housing-like structure formed by top and bottom plates 74, 76, front and rear plates 80, 82 and left and right side plates 84, 86. A variety of other types of frame constructions are possible. Optionally, the end effector 42 may include a ply carrier support assembly 60 for supporting a ply carrier 58, such as that previously described in connection with FIG. 5, during the ply forming sequence. The ply carrier support assembly 60 includes a pair of spaced apart uprights 64 attached to the top plate 74. A forwardly extending arm 66 is slidably mounted on each of the uprights 64, allowing the height of the arm 66 to be adjusted. A ply carrier clamp 68 is mounted for adjustment along the length of each of the arms 66. The ply carrier clamps 68 function to releasably clamp the top edge of the ply carrier 58, and hold the ply carrier 58 as it and the ply 54 are being formed over the tool 48. As will be discussed below in more detail, local sections 38 (FIGS. 8 and 9) of the compliant nosepiece assembly 56, are extended or retracted as necessary to conform the ply 54 onto the tool surfaces 52. For example, the numeral 57 in FIG. 9 indicates the altered shape of the nosepiece assembly 56 used to form a ply 54 into the shape of the part shown in FIGS. 1 and 2.

Figure 11:
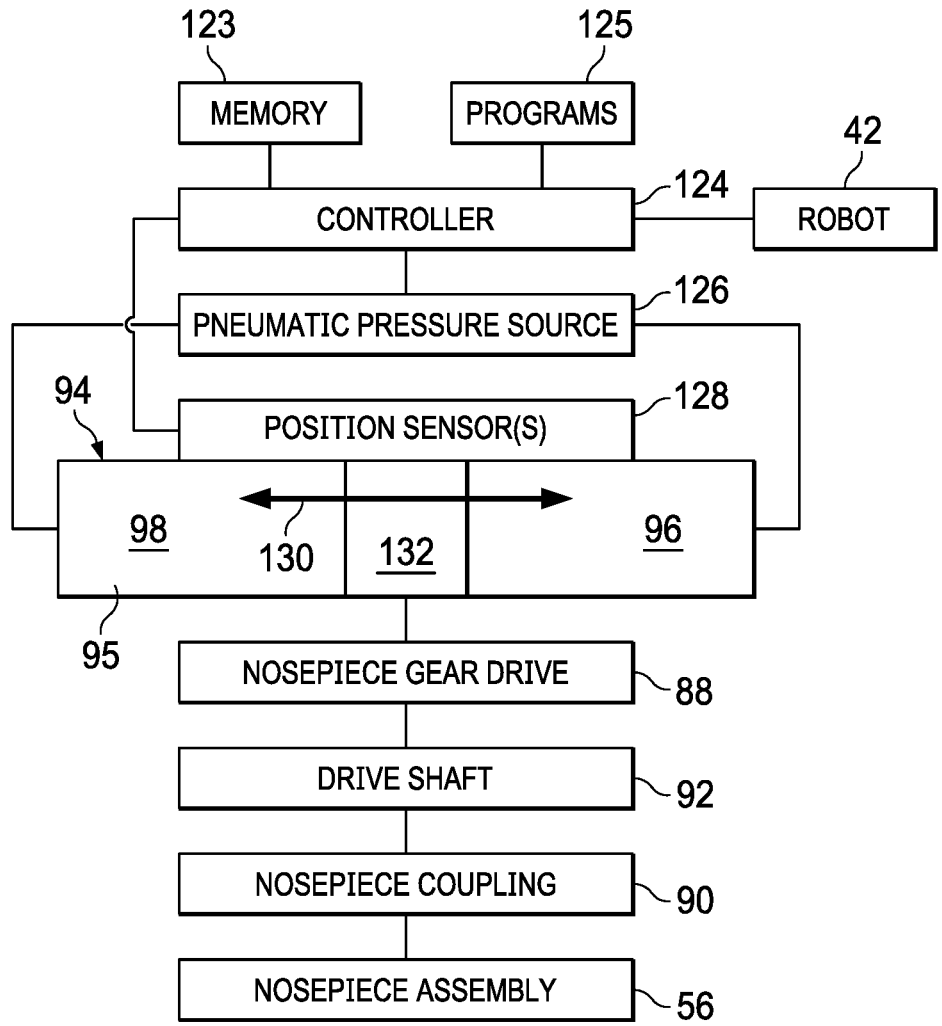
FIG. 11 is an illustration of an overall block diagram of a system for forming and compacting composite plies utilizing the end effector.
Figure 12:
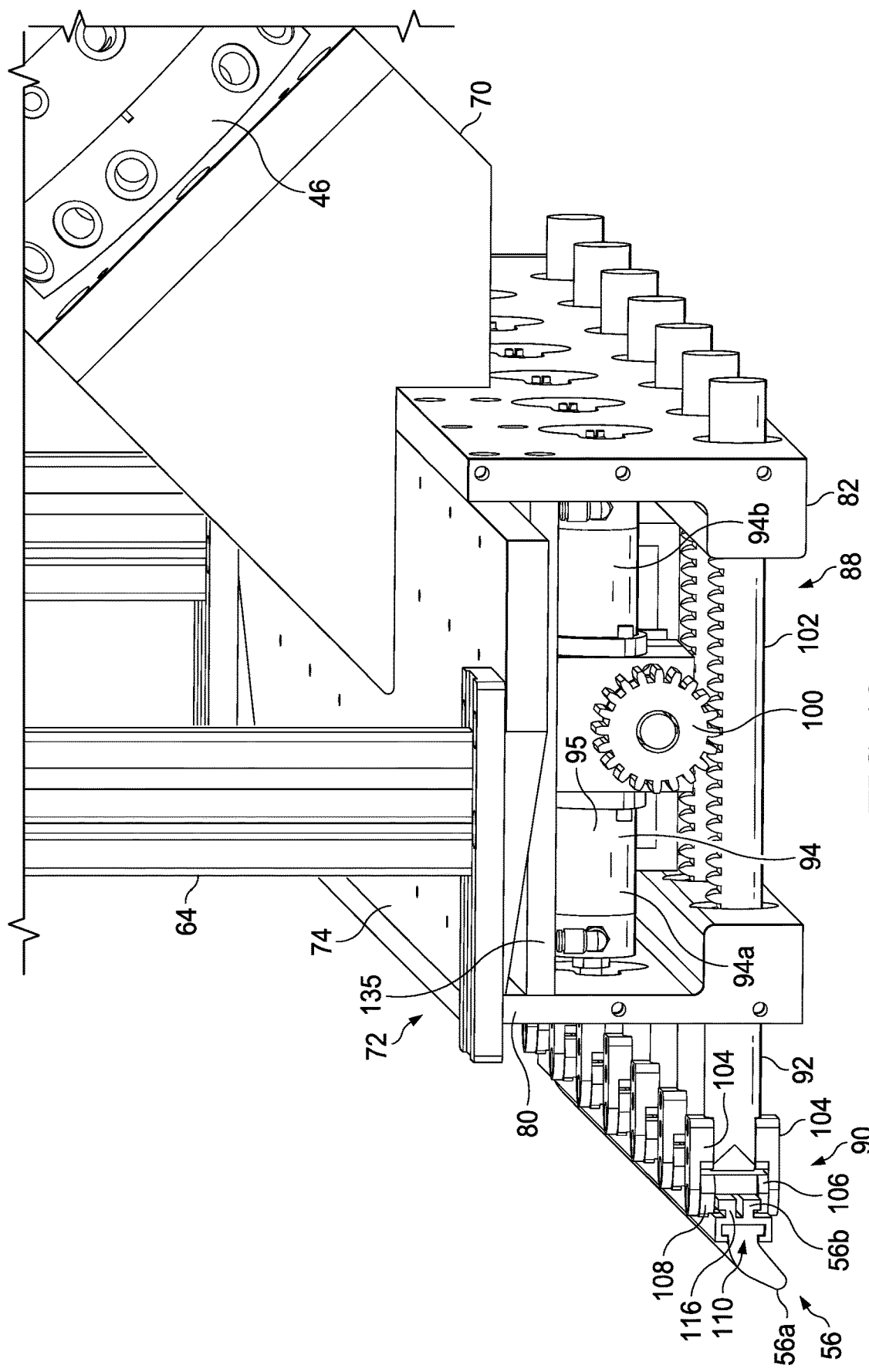
FIG. 12 is an illustration of a fragmentary, perspective view of the left end of the end effector, a cover plate having been removed to better reveal details of the nosepiece drive.
Figure 13:
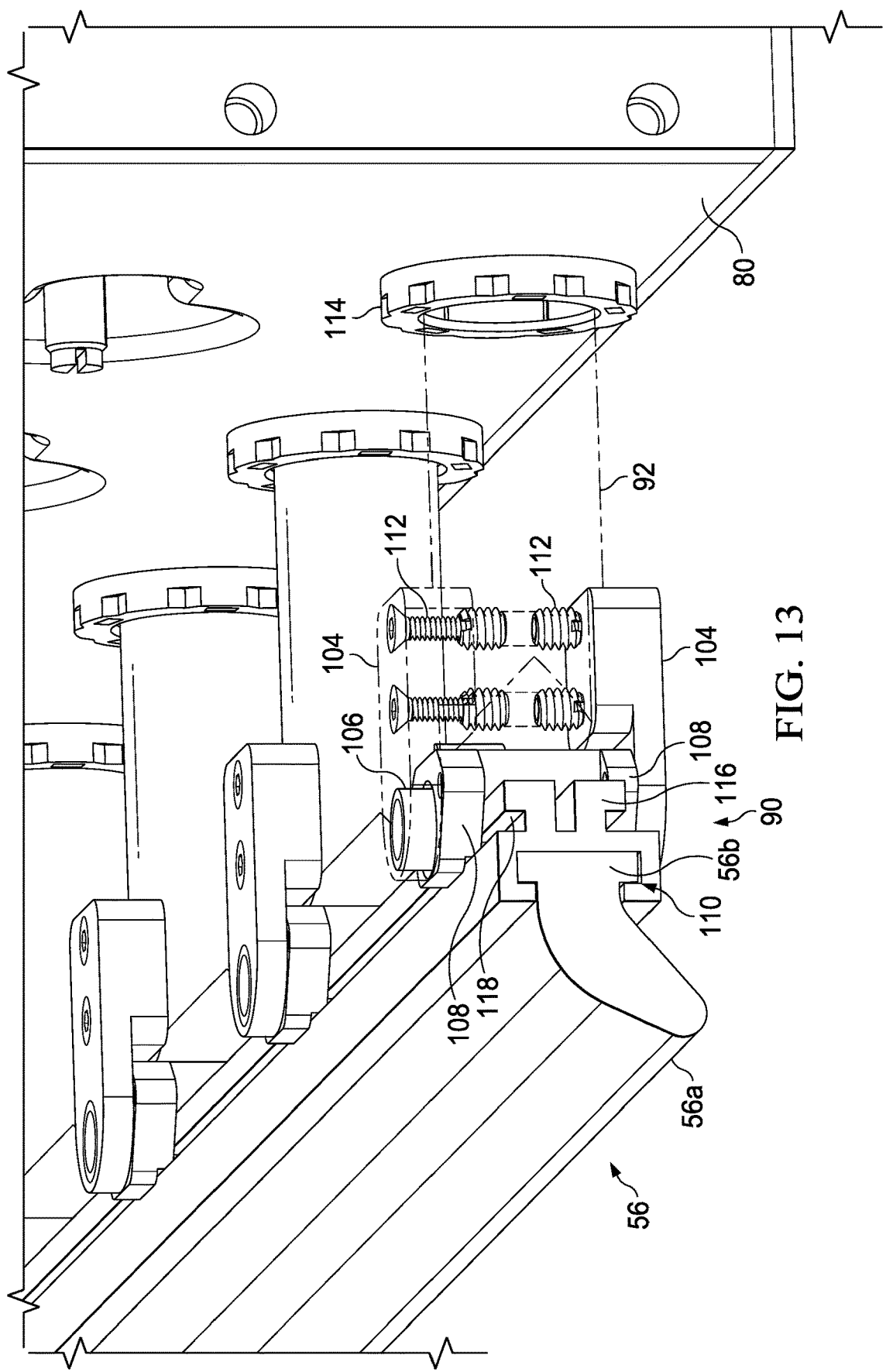
FIG. 13 is an illustration of a fragmentary perspective view showing the nosepiece coupling.
Figure 14:
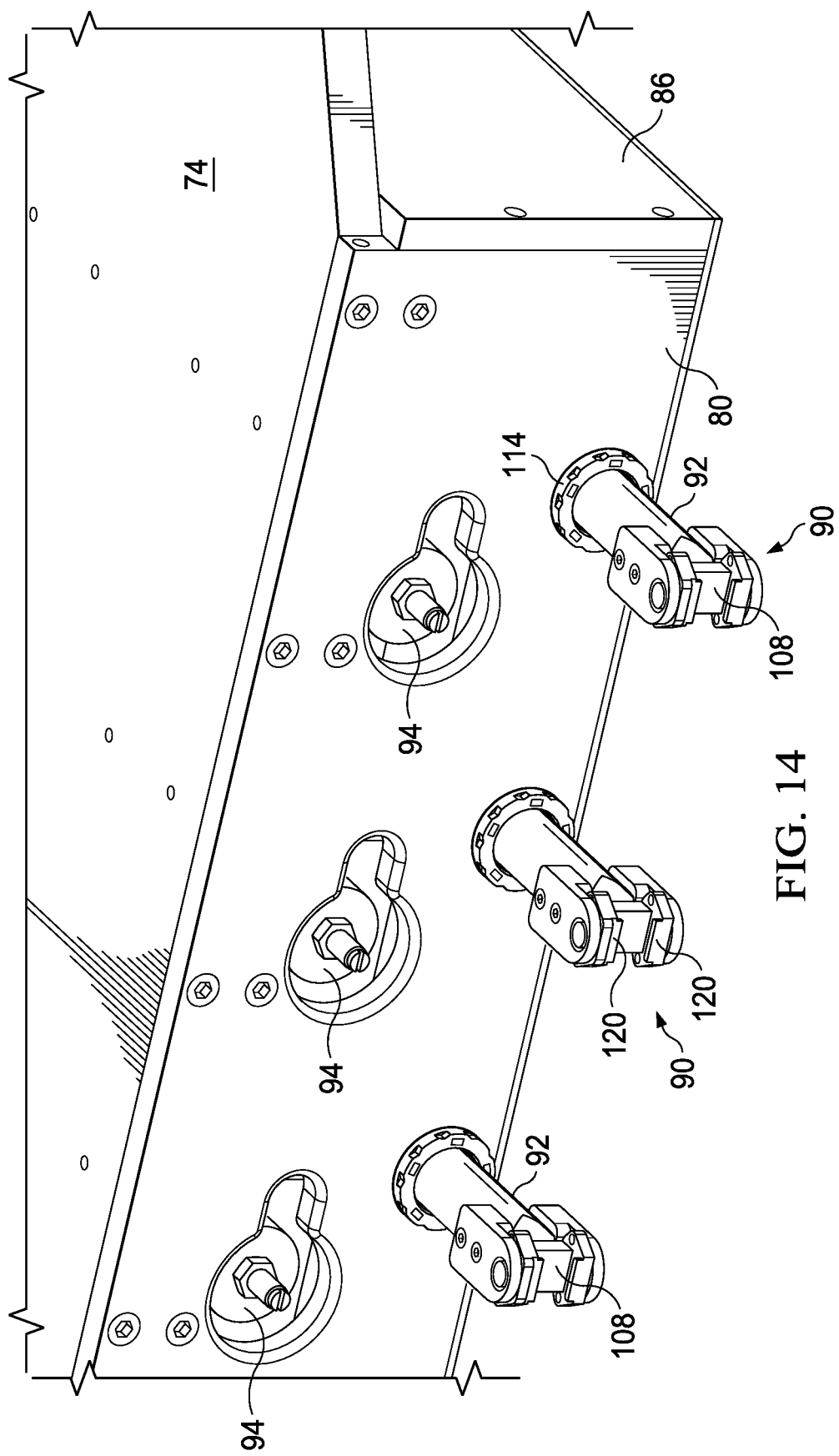
FIG. 14 is an illustration of a fragmentary, perspective view of the front of the end effector, the nosepiece having been removed to reveal the nosepiece couplings.
Figure 15:
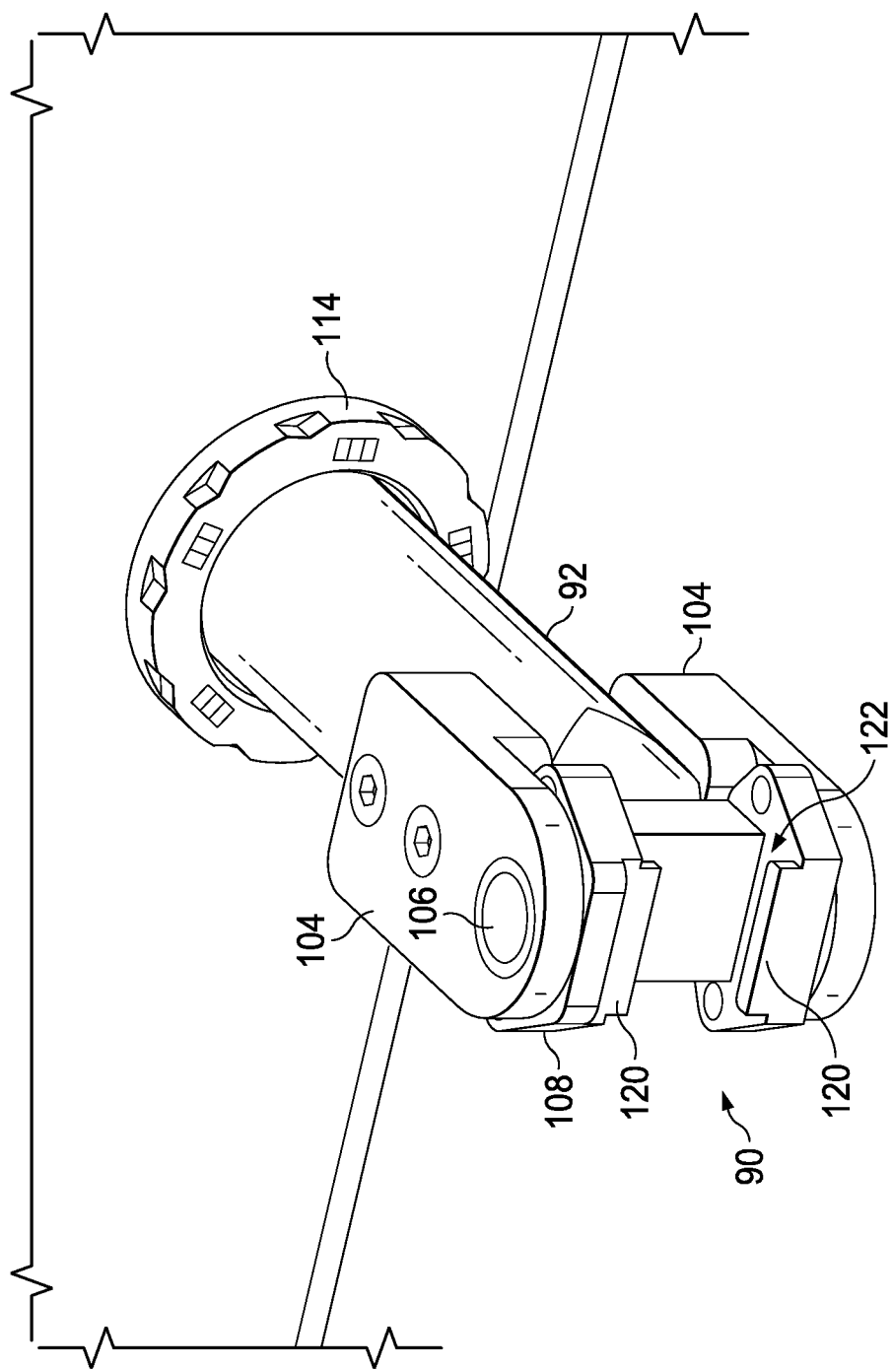
FIG. 15 is an illustration of a perspective view of one of the nosepiece couplings.

FIGS. 11-17 illustrate additional details of a system for controlling the operation of the nosepiece assembly 56 in a manner that allows local sections 38 (see FIGS. 8 and 9) of the nosepiece assembly 56 to bend and closely conform to highly contoured surfaces of the tool 48. The system also allows the compliancy of the nosepiece assembly 56 to be adjusted, either periodically or continuously as the ply 54 is being swept over the tool 48. Referring particularly to FIGS. 11 and 12, the position of local sections 38 of the nosepiece assembly 56 are controlled by a plurality of respectively associated actuators 94, only one such actuator 94 being shown in FIG. 11 for clarity. In the present example, the actuators 94 are pneumatically controlled rotary actuators 94, however other types of actuators generating a driving force are possible. The actuators 94 are powered by a source of pneumatic pressure 126 that is controlled by a controller 124 which may comprise, for example and without limitation, a general-purpose program computer or a programmable controller. The controller 124 may be dedicated to controlling the operations of the end effector 42, or may also be employed to control operation of the robot 40.

Each of the actuators 94 includes a cylinder 95 and an internal piston 132 that separates the cylinder 95 (FIG. 11) into two of pressure chambers 96, 98. In the illustrated embodiment, the piston 132 is formed of a magnetic material for purposes that will be described later. The two chambers 96, 98 are respectively connected with, and are separately pressurized by the pneumatic pressure source 126, allowing the air pressure in the chambers 96, 98 to be independently controlled, and permitting a preselected amount of pressure to be applied to local sections 38 of the nosepiece 56a.

Depending on the application, the actuator 94 may include adjustable stops (not shown) and an internal rack and pinion arrangement (not shown) which translates linear movement of the piston 132 into rotary motion used to drive a pinion gear 100. Force generated by the actuator 94 is transmitted through a nosepiece gear drive 88 to a drive shaft 92. The drive shaft 92 is coupled through a swiveling nosepiece coupling 90 to the nosepiece 56. Depending upon the amount of air pressure supplied to each of the chambers 96, 98, a local section of the nosepiece assembly 56 can be either extended or retracted, thereby conforming that local section 38 of the nosepiece assembly 56 to the geometry of the tool surface 52. As will become apparent below, the rotary actuators 94 control both the linear position of each section 38 of the nosepiece assembly 56 along its length, as well as the degree of compliancy of that section of the nosepiece assembly 56. Thus, the forming force applied to the ply 54 by each section of the nosepiece 56a can be individually controlled to ensure that the ply closely conforms to any tool surfaces 52 that are highly contoured.

One or more position sensors 128 are provided to sense the position of the piston 132. As explained above, the position of a local section 38 of the nosepiece assembly 56 is directly related to the state of the actuator 94, and more specifically that of the piston 132. Thus, by sensing the position of the piston 132, the position of the local section 38 of the nosepiece assembly 56 as well as the tool surface 52, is likewise determined and can be recorded. In the illustrated embodiment, the position sensor 128 may be external to or integrated within the actuator 94. The position sensor 128 is magnetically coupled with the piston 132 and functions as an encoder that produces a digital feedback signal to the controller 124 that is representative of the position of the piston 132, and thus that of the nosepiece assembly 56 and tool surface 52. A variety of other types of position sensors 128 are possible, however. The feedback signal mentioned above may be sent to the controller 124 and used by the controller 124 to adjust the position and/or degree of compliancy of local sections 38 of the nosepiece assembly in order to better conform the ply 54 to the tool surfaces 52. This adjustment may be made periodically or continuously during the ply forming process.

As the nosepiece assembly 56 sweeps the ply 54 down all over the tool surfaces 52, the position of the piston 132 and plus that of the nosepiece 56 can be stored in a memory 123, and later used to adjust control of one or more of the actuators 94, or stored as archival data for quality control for other purposes, according to one or more software programs 125.

Referring particularly to FIG. 12, the actuators 94 are arranged side-by-side, one corresponding to each local section 38 of the nosepiece assembly 56, and are attached to the bottom of a support plate 135 that is extends between the front and rear plates 80, 82 respectively. Each of the nosepiece gear drives 88 comprises the previously mentioned rotatable pinion gear 100, and a gear rack 102 that is integrally formed in a portion of the drive shaft 92. Each of the drive shafts and 92 is slidably supported within later discussed guide bearings 114 (see e.g. FIG. 14) mounted on the front and rear plates 80, 82 respectively.

As previously discussed, the pinion gear 100 is driven by the rotary movement of the piston 132 within the actuator cylinder 95. Rotation of the pinion gear 100 therefore linearly displaces the drive shaft 92, causing a section of the nosepiece 56 to either extended or retract. In the illustrated example, pressurizing chamber 94a displaces the internal actuator piston 132 to the right (as viewed in FIGS. 11 and 12) causing the pinion gear 100 to rotate counterclockwise, thereby retracting the corresponding section of the nosepiece 56. Similarly, pressurizing chamber 94b displaces the rotary actuator piston 132 to the left, causing the pinion gear 100 to rotate clockwise, which results in an extension of the corresponding section of the nosepiece 56.

Attention is now directed to FIGS. 13-17 which illustrate additional details of the nosepiece coupling 90 which connects the nosepiece assembly 56 and nosepiece track 56b with the outer ends of the drive shafts 92. The nosepiece assembly 56 comprises an elongated, compliant nosepiece 56a that is received within a keyway 110 in the nosepiece track 56b. The nosepiece track 56b may be formed of a flexible material allowing it to flex as required during a forming operation, or alternatively, may be segmented along its length and/or formed of a plurality of interconnected track elements that may flex relative to each other.

Figure 16:
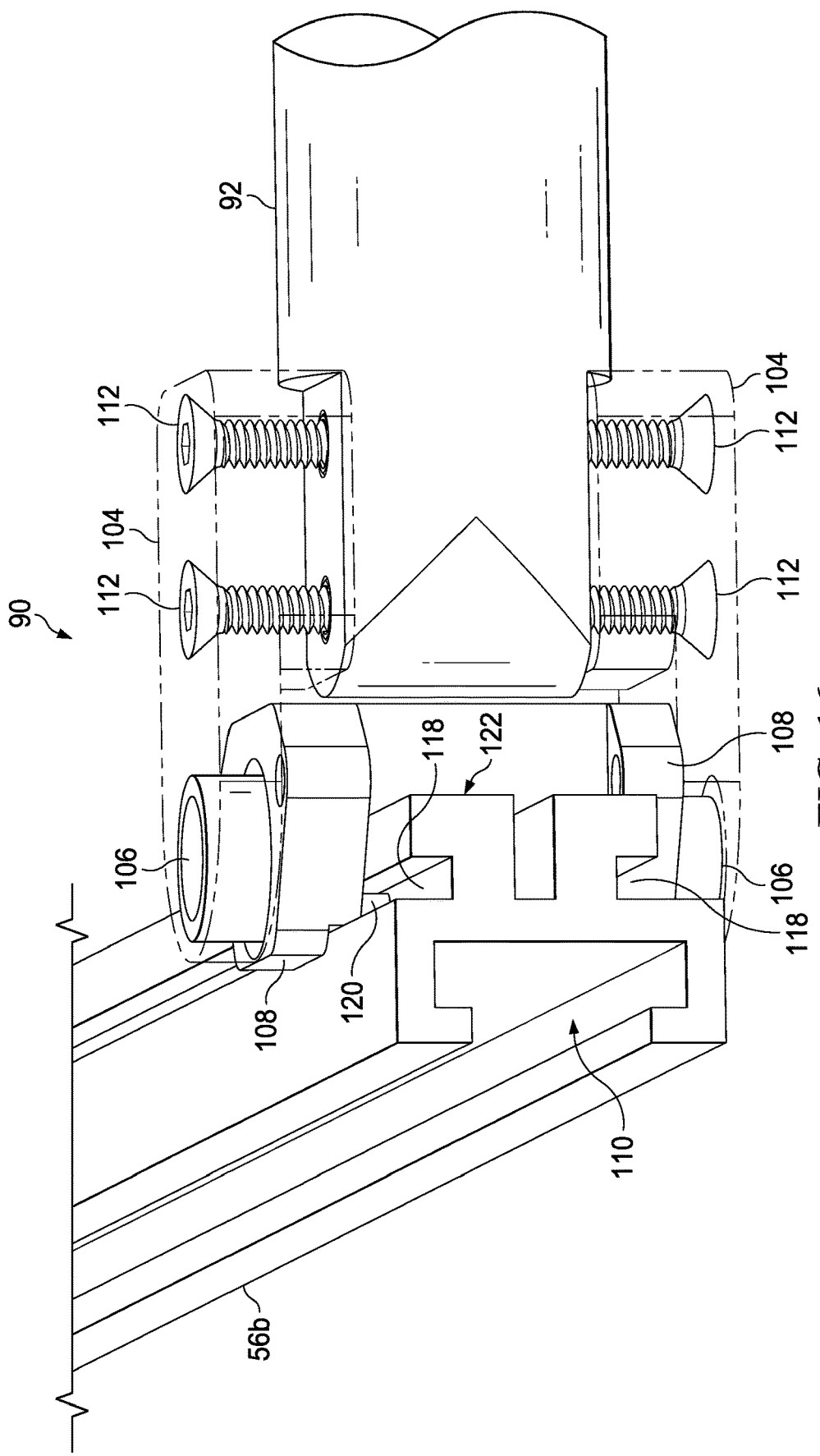
FIG. 16 is an illustration of a perspective view of one of the nosepiece couplings shown in FIG. 14, the nosepiece having been removed, the bearing supports being shown in the phantom.
Figure 17:
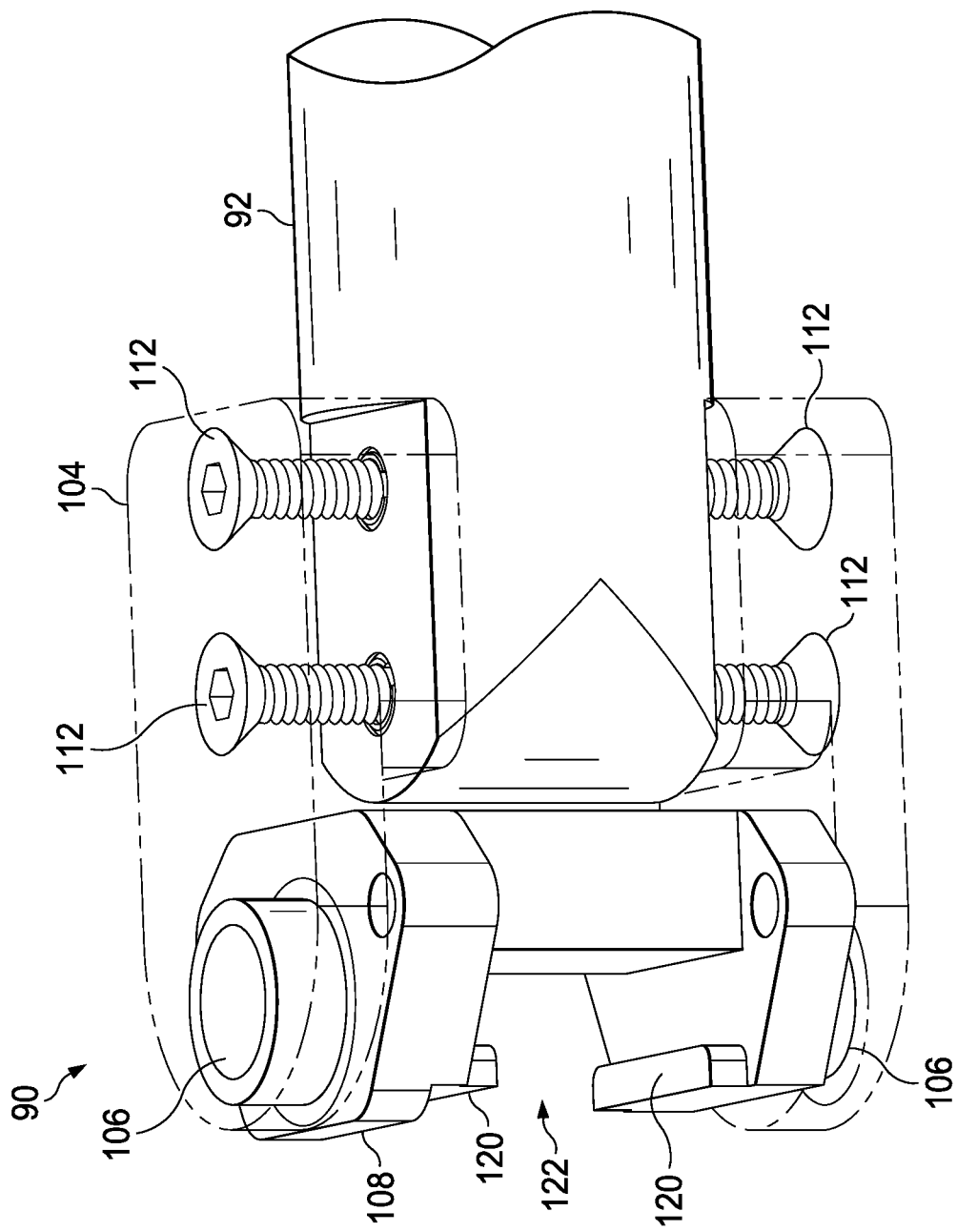
FIG. 17 is an illustration of a perspective view similar to FIG. 16, but wherein the nosepiece and nosepiece track have been removed for clarity.

Each of the nosepiece couplings 90 comprises a pair of the bearing supports 104 and a clevis-like nosepiece holder 108. Each of the bearing supports 104 is secured to the outer ends of the drive shaft 92 by suitable fasteners, such as screws 112. The nosepiece holder 108 is mounted for swiveling or pivotal motion between the bearing supports 104 by top and bottom bushings 106. The bushings 106 form a swivel point that allows the nosepiece assembly to flex. The bushings 106 may be formed of a low friction/low wear material such as, for example and without limitation, PTFE (polytetrafluoroethylene). The nosepiece holder 108 includes a guideway 122 that is partially formed by a pair of integrally formed, opposing ears 120. As best shown in FIGS. 16 and 17, the nosepiece track 56b is slidably received within the guideway 122 and is held by the ears 120 which are received within channels 118 in the nosepiece track 56b. During a forming operation, the nosepiece track 56b slides as required within the guideways 122 of each nosepiece holder 108, and each nosepiece holder 108 swivels or pivots as necessary to accommodate flexing of the nosepiece assembly 56.

In use, a suitable ply 54 is placed on a flexible ply carrier 58 and may be held in place by a tacking medium, or owing to the tack of the ply 54 itself. The ply carrier 58 is then installed in the ply carrier support assembly 60 which suspends the ply 54 in front of the nosepiece assembly 56. Then, as previously described in connection with FIG. 5, the robot 40 moves the end effector 42 until the ply contacts a surface 52 of the tool 48. Next, the actuators 94 are operated to extend or retract the nosepiece assembly 56 until the latter matches the shape of the tool 48 onto which the ply 54 is to be formed. Next, the robot 40 moves the nosepiece assembly 56 into contact with the ply carrier 58 (or the ply 54 if no ply carrier is present) until the nosepiece 56a forces the ply 54 against the tool 48. The robot 40 then manipulates the end effector 42 in a manner that causes the nosepiece 56a to sweep the ply 54 down over the surfaces 52, thereby forming and compacting the ply 54 onto the tool 48. After the ply 54 has been fully formed, the ply carrier 58 is peeled away from the fully formed ply 54, using either the motion of the robot, or manually by unclamping the ply carrier 58 and peeling it away from the ply 54.

In preparation for forming a ply 54 onto a tool 48, or at any point during the ply forming process, the actuators 94 may be operated to alter the shape of the nosepiece assembly 56 in order to match the local geometry of the tool surfaces 52. As the actuators 94 are individually operated to effect reshaping of local sections 38 of the nosepiece assembly 56, the nosepiece couplings 90 swivel as necessary as the nosepiece assembly 56 swivels, while also permitting the nosepiece track 56b to slide through the nosepiece holders 108, as needed, in order to transform the nosepiece assembly 56 to the desired shape.

As previously discussed, the degree of extension or retraction of the local sections 38 of the nosepiece assembly 56 is determined by the position of the actuator piston 132 (FIG. 11) which in turn is dependent upon the pressure differential between the two cylinder chambers 96, 98. The pressure differential between the two cylinder chambers 96, 98 also determines the amount of pressure a local section 38 of the nosepiece assembly 56 applies to the ply 54 during the forming process. Extension of the nosepiece assembly 56 is achieved by increasing pressure in chamber 98 while retraction of the nosepiece assembly 56 is achieved by increasing the pressure in chamber 96.

The use of the actuators 94 in combination with the nosepiece gear drive 88 provides an additional level of nosepiece compliancy beyond that provided by the compliance provided by the nosepiece 56a itself during a ply forming sequence. For example, depending upon the pressure differential present in cylinder chambers 96, 98, the reaction force resulting from the nosepiece assembly 56 engaging the tool 48 may be transmitted back through the drive shaft 92 to cause "backward" displacement of the piston 132 toward chamber 96 until the applied and reaction forces become equalized. During a ply forming sequence, chamber 98 acts as the force applying side of the actuator 94, while chamber 96 acts as a cushion side of the actuator 94, allowing a precisely controlled force to be applied to the individual sections of the nosepiece 56a along its length. In effect, the ability of the actuators 94 to limit the force they apply to the nosepiece assembly 56 based on the reaction force mentioned above provides the nosepiece assembly 56 with an added degree of compliancy. The amount of the force that is applied to the nosepiece assembly 56 and thus to the ply 54 may be periodically or continuously adjusted by the controller 124. The ability to adjust the compliancy of the nosepiece assembly 56 may improve the uniformity and/or consistency of the forming force that is applied by the nosepiece assembly 56 to the ply during a forming operation.

Each of the actuators 94 may be independently locked, thereby firmly fixing the position of the related local section 38 of the nosepiece assembly 56. Locking of an actuator 94 is achieved by equalizing the pressure in the two chambers 96, 98 at a higher than normal level, such that the force produced by the actuator 94 to extend nosepiece assembly 56 is substantially greater than the reaction force transmitted from the nosepiece back to the actuator 94. This locking feature of the actuators 94 may be useful to control forces at contact areas of the nosepiece 54a that are adjacent to the locked actuators 94. By controlling these forces, the local section of ply 54 between the locked actuators 94 can be better conformed to the tool surfaces 52. For example, the actuators 94 on opposite sides of a local section 38 of the nosepiece assembly 56 can be locked in order to cause the portion of the ply 54 between these two actuators to better conform to a highly contoured local area of the tool surface 52.

As previously discussed, the use of the position sensors 128 allows recordation of the position of the nosepiece 56a, at various points or continuously if desired, as the nosepiece assembly 56 sweeps a ply 54 over the tool surfaces 52. This nosepiece position data can be stored in memory 123, and then later used to facilitate programming/reprogramming of the robot 40. The nosepiece position data may also be used for quality control purposes. For example, nosepiece position data may be accumulated for a number of parts and then compared to actual part measurements.

FIG. 18 illustrates the overall steps of a method forming a ply 54 on a contoured tool 48 using the end effector 42 previously described. At 127, a compliant nosepiece 56 with compliancy is configured to a desired shape using a plurality of actuators 94. At 129, the compliant nosepiece 56 is brought into contact with a ply 54. At 131, the ply 54 is swept over the contoured tool 48 using the compliant nosepiece 56. The compliant nosepiece 56 is used to compact the ply 54 on the contoured tool 48. At 133, the compliancy of the compliant nosepiece 56 is adjusted.

Embodiments of the disclosure may find use in a variety of potential applications, particularly in the transportation industry, including for example, aerospace, marine, automotive applications and other application where pressurized fluid tubes, such as fuel systems and hydraulic systems in aircraft, may be used. Thus, referring now to FIGS. 19 and 20, embodiments of the disclosure may be used in the context of an aircraft manufacturing and service method 134 as shown in FIG. 19 and an aircraft 136 as shown in FIG. 20.

Aircraft applications of the disclosed embodiments may include, for example, without limitation, a wide range of composite laminate parts used in the airframe 152 or interior 156 of the aircraft 136. During pre-production, exemplary method 134 may include specification and design 138 of the aircraft 136 and material procurement 140. During production, component and subassembly manufacturing 142 and system integration 144 of the aircraft 136 takes place. Thereafter, the aircraft 136 may go through certification and delivery 146 in order to be placed in service 148. While in service by a customer, the aircraft 136 is scheduled for routine maintenance and service 140, which may also include modification, reconfiguration, refurbishment, and so on.

Each of the processes of method 134 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 136 produced by exemplary method 134 may include an airframe 152 with a plurality of systems 154 and an interior 156. Examples of high-level systems 154 include one or more of a propulsion system 158, an electrical system 160, a hydraulic system 162 and an environmental system 164. Any number of other systems may be included. Although an aerospace example is shown, the principles of the disclosure may be applied to other industries, such as the marine and automotive industries.

Systems and methods embodied herein may be employed during any one or more of the stages of the production and service method 134. For example, components or subassemblies corresponding to production process 142 may be fabricated or manufactured in a manner similar to components or subassemblies produced while the aircraft 136 is in service. Also, one or more apparatus embodiments, method embodiments, or a combination thereof may be utilized during the production stages 142 and 144, for example, by substantially expediting assembly of or reducing the cost of an aircraft 136. Similarly, one or more of apparatus embodiments, method embodiments, or a combination thereof may be utilized while the aircraft 116 is in service, for example and without limitation, to maintenance and service 150.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An end effector configured to form a composite ply onto a contoured tool surface, such that the end effector comprises:
a nosepiece that comprises: a single continuous elongated form, and a compliancy that adjusts to form the composite ply down against the contoured tool surface;
a plurality of nosepiece drives, each nosepiece drive in the plurality of nosepiece drives coupled, respectively, with a section of the nosepiece, along its length via a nosepiece coupling; and
a plurality of actuators respectively coupled with the plurality of nosepiece drives, each actuator of the plurality of actuators being configured to displace, respectively, the section of the nosepiece, such that each actuator of the plurality of actuators, respectively, comprises:
a pinion gear driven by the actuator and coupled to a gear rack; and
a piston that separates a chamber configured as a cushion side of each of the actuators from a second chamber configured to apply force by each of the actuators to the nosepiece.

2. The end effector of claim 1,
wherein the nosepiece coupling comprises a pair of opposing ears configured to engage channels in a nosepiece track that comprises a keyway configured to receive and retain the nosepiece, and is configured to allow swiveling of the section of the nosepiece relative to the nosepiece drive.

3. The end effector of claim 2, wherein:
the nosepiece drive includes a drive shaft, and
the nosepiece coupling comprises bearing supports, a nosepiece holder and bushings that mount the nosepiece holder on the bearing supports.

4. The end effector of claim 1, further comprising:
a plurality of position sensors respectively configured to sense positions of the plurality of actuators.

5. The end effector of claim 4, further including a controller coupled with each of the plurality of actuators and each of the plurality of position sensors for controlling operation of each of the plurality of actuators based on the positions of each of the plurality of actuators sensed by the plurality of position sensors.

6. The end effector of claim 1, further comprising each actuator of the plurality of actuators configured to operate pneumatically and the chamber configured as the cushion side of each of the plurality of actuators and the second chamber configured to be coupled with a pneumatic pressure source, such that a pressure differential present between the chamber configured as the cushion side of each of the plurality of actuators and the second chamber determines the compliancy.

7. The end effector of claim 1, further comprising:
a frame; and
a ply carrier support assembly mounted on the frame and configured to support a ply carrier between the nosepiece and the contoured tool surface.

8. A method of forming a ply on a contoured tool, the method comprising:
sliding a nosepiece, comprising a single elongated form comprising a compliancy, into keyway in a nosepiece track comprising channels;
sliding the nosepiece track into a guideway in a plurality of nosepiece couplings configured to swivel and connected to a plurality of drive shafts within a frame connected to an end effector via sliding opposing ears of the plurality of nosepiece couplings through the channels;
configuring the nosepiece to a desired shape using a plurality of actuators in the frame;
bringing the nosepiece into contact with the ply;

sweeping the ply over the contoured tool using the nosepiece, including using the nosepiece to compact the ply on the contoured tool; and adjusting the compliancy of the nosepiece, respectively for each actuator in the plurality of actuators, via a piston separating a chamber configured as a cushion side of the actuator from a second chamber applying a force from the actuator to the nosepiece and controlling a pressure differential between the chambers.

9. The method of claim 8, wherein adjusting the compliancy includes adjusting forces applied to the nosepiece.

10. The method of claim 9, wherein adjusting the compliancy of the nosepiece is performed during sweeping of the ply over the contoured tool.

11. The method of claim 9, wherein:
controlling the pressure differential comprises using a sensor tracking a position of the piston and controlling the position of the piston.

12. The method of claim 8, including:
sensing a position of the nosepiece during sweeping of the ply over the contoured tool,
generating a feedback signal representing the position of the nosepiece sensed during sweeping the ply over the contoured tool,
sending the feedback signal to a controller, and
adjusting at least one of the compliancy and the position of the nosepiece using the controller and the feedback signal.

13. The method of claim 12, wherein sensing the position of the nosepiece includes sensing the position of the piston within each of the plurality of actuators.

14. An apparatus configured to form a composite ply onto a contoured tool surface, such that the apparatus comprises:
an end effector configured to be mounted on an automatically controlled manipulator and connected to a nosepiece that comprises a single continuous elongated form configured with a compliancy that adjusts to form the composite ply onto the contoured tool surface, and having a plurality of local sections along its length;
a plurality of rotary actuators configured to be coupled with a source of pneumatic pressure and pneumatically operated;

a plurality of position sensors configured to respectively sense a position of a piston that separates a chamber configured as a cushion side of the plurality of rotary actuators from a second chamber configured to apply a force from the plurality of rotary actuators to the nosepiece via a plurality of nosepiece drives respectively coupled between the plurality of rotary actuators and the nosepiece, the plurality of nosepiece drives being configured to extend and retract corresponding local sections of the nosepiece via a nosepiece coupling that comprises a pair of opposing ears configured to engage channels in a nosepiece track that comprises a keyway configured to receive and retain the nosepiece; and,
a controller, coupled with the plurality of rotary actuators and the plurality of position sensors, configured to operate the plurality of rotary actuators.

15. The apparatus of claim 14,
wherein the nosepiece coupling is configured to allow swiveling of a local section of the nosepiece relative to a nosepiece drive of the plurality of nosepiece drives.

16. The apparatus of claim 14, further including:
a controller coupled with each rotary actuator of the plurality of rotary actuators and the plurality of position sensors and configured to control operation of the plurality of rotary actuators based on positions sensed by the plurality of position sensors.

17. The apparatus of claim 14,
wherein the compliancy is determined by a pressure differential present between the chamber configured as the cushion side of the plurality of rotary actuators and the second chamber.

18. The apparatus of claim 14, including a memory for storing positions of the plurality of rotary actuators sensed by the plurality of position sensors.

19. The apparatus of claim 18, including a software program configured to direct the controller to control the plurality of rotary actuators based on positions of the plurality of rotary actuators sensed by the plurality of position sensors and stored in the memory.

* * * * *